US006643774B1

(12) United States Patent
McGarvey (10) Patent No.: US 6,643,774 B1
(45) Date of Patent: Nov. 4, 2003

(54) AUTHENTICATION METHOD TO ENABLE SERVERS USING PUBLIC KEY AUTHENTICATION TO OBTAIN USER-DELEGATED TICKETS

(75) Inventor: John Ryan McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/287,993

(22) Filed: Apr. 8, 1999

(51) Int. Cl.[7] .............................. H04L 9/00; H04L 12/22
(52) U.S. Cl. ........................ 713/155; 713/156; 713/164; 713/170; 713/176; 380/30; 380/259; 380/282
(58) Field of Search ....................... 380/30, 259, 282; 713/155, 156, 164, 170, 176

(56) References Cited

U.S. PATENT DOCUMENTS

| 5,544,322 A | | 8/1996 | Cheng et al. | 395/200.12 |
|---|---|---|---|---|
| 5,757,920 A | * | 5/1998 | Misra et al. | 380/25 |
| 5,809,144 A | * | 9/1998 | Sirbu et al. | 380/25 |
| 5,815,574 A | | 9/1998 | Fortinsky | 380/25 |
| 6,148,404 A | * | 11/2000 | Yatsukawa | 713/200 |

OTHER PUBLICATIONS

Sirbu et al., "Distributed Authentication in Kerberos Using Public Key Cryptography," Symposium on Network and Distributed System Security, Feb. 10–11, 1997.*

Tung et al., Internet Draft, IETF, Request for Comments, RFC 1510, 1999.*

DASCOM Provides Kerberos Authentication Module for New Netscape Certificate Management System 4.0; IntraVerse Provides Enterprise Access Control for Enterprise Applications, Business Wire, Jan. 19, 1999, San Jose, Calif.

* cited by examiner

Primary Examiner—Gilberto Barron
Assistant Examiner—Paul Callahan
(74) Attorney, Agent, or Firm—Gregory M. Doudnikoff; Marcia L. Doubet (57) ABSTRACT

A method, system, and computer-readable code for delegating authority in a public key authentication environment from a client to a server machine or process, in order that the server machine or process can then securely access resources and securely perform tasks on behalf of the client. The authority is delegated by obtaining tickets (or other equivalent representation of user credentials) from a private key system, such as the Kerberos system, where the tickets identify a user's access rights or privileges. The present invention provides several alternative techniques with which this delegation model can be implemented. In these techniques, the client does not directly access the private key system.

30 Claims, 8 Drawing Sheets

FIG. 8
Fourth Preferred Embodiment

AUTHENTICATION METHOD TO ENABLE SERVERS USING PUBLIC KEY AUTHENTICATION TO OBTAIN USER-DELEGATED TICKETS

BACKGROUND OF THE INVENTION

1. Field of the Invention

The present invention relates to a computer system, and deals more particularly with a method, system, and computer-readable code for delegating authority in a public key authentication environment from a client to a server machine or process, in order that the server machine or process can then securely access resources and securely perform tasks on behalf of the client. This technique is defined in a manner where the client does not directly access the private key system.

2. Description of the Related Art

Public key authentication of users is becoming increasingly common, especially in Internet environments for electronic commerce. The Internet was originally designed with the academic and scientific communities in mind, and it was assumed that the users of those communities would be working in a non-adversarial, cooperative manner. Thus, the Internet was designed without security features inherent in the network. As the Internet expands out into the public sector, commercial aspects are becoming increasingly common, giving rise for the need to protect assets and resources by providing security measures.

With the need for more secure communications, different types of security systems and measures have evolved over time. Each system has attempted to address the security issues for protecting communications in an unsecure environment (such as the Internet). One aspect of secure communications is the ability to ensure that a communication received has actually come from the person believed to have generated it and not from someone impersonating that person on the network. This is known as "authentication".

One of the oldest and most common security systems today is what is known as a "private key" security system. Private key systems involve two users, both of whom have a shared secret (or private) key for encrypting and decrypting information passed between them over a network. Before communications can occur, the two users must communicate in some secure manner to agree on this private key to ensure the key is known only to the two users. An example of a private key security system is the Kerberos system developed by the Massachusetts Institute of Technology. Private key systems have a number of drawbacks in an open network environment such as the Internet, however, where users will conduct all communications over the open network environment and do not need or want the added overhead and expense of a secure means of exchanging key information before secure network communications occur.

To address the limitations of private key systems, security systems known as "public key" systems evolved. In a public key system, a user has a key pair that consists of a private key and a public key, both keys being used to encrypt and decrypt messages. The private key is never to be divulged or used by anyone but the owner. The public key, on the other hand, is available to anyone who needs to use it. As an example of using the key pair for encrypting a message, the originator of a message encrypts the message using the receiver's public key. The receiver then decrypts the message with his private key. To use a key pair for authentication, the message originator digitally signs the message (or a digest there of) using his own private key. The receiver decrypts the digital signature using the sender's public key.

Today, public key systems do not provide a delegation model whereby a server machine or process can be authorized to act on behalf of a user. A delegation model would allow, for example, a user to authorize a server or process to have the same access and privileges for protected resources as that user has. This would allow the server machine or process to act on behalf of the user, without requiring ongoing involvement of the user.

The Kerberos system includes a delegation model that allows a user to obtain a Kerberos ticket for a particular resource. This ticket can then be delivered to a server machine or process for use by that server machine or process on behalf of the user. The Kerberos system alone, however, is not appropriate for a public network environment such as the Internet because it requires all administrators of user identities to have equal access to the network resources protected by Kerberos. In addition, Kerberos is a private key system. This means the Kerberos server would need to securely maintain the private key of each user with whom it exchanges secure messages. This is an unrealistic administrative burden in a public access environment.

Request for Comments ("RFC") 68.4, entitled "Integration of DCE and Public Key Technologies", proposes one solution to this problem, where a client communicates directly with a Kerberos server using public key authentication. The client obtains a ticket-granting ticket (TGT) from the Kerberos server, and then uses this TGT to obtain additional tickets from the Kerberos server as needed for particular units of work. Such tickets are sent from the client to the delegated server, so that this delegated server can perform the work on the client's behalf. This approach has a number of drawbacks, however. First, the client software must be changed to support communication with the Kerberos server. Second, users and clients outside the enterprise must be able to access the Kerberos server directly with this approach. Thus, this technique makes the Kerberos server, which is the critical point in Kerberos security, vulnerable to access from the outside. Third, the TGT actually passes outside the enterprise with this approach, creating some security exposures. Fourth, firewalls must be modified or configured to permit access to the Kerberos server from outside the enterprise. While RFC 68.4 may be beneficial within an enterprise, these drawbacks make it a less-than-optimal solution for Internet and extranet commerce. (The RFC 68.4 specification is available on the World Wide Web at http://www.opengroup.org/dce/tech/pki/index.html.)

Accordingly, what is needed is a technique for providing delegation of authority to a server machine or process in a public key environment without a client directly accessing a private key authentication system.

SUMMARY OF THE INVENTION

An object of the present invention is to provide a technique whereby a client delegates authority to a server machine or process.

Another object of the present invention is to provide this technique whereby a private key authentication system is used to obtain client credentials for use in a public key system.

A further object of the present invention is to provide this technique whereby the client credentials are used to define the resource access for which this client is authorized.

Another object of the present invention is to provide a technique whereby access to protected resources by a server machine or process on behalf of a client in a public key environment is controlled using information obtained from a private key system.

A further object of the present invention is to provide this delegation technique whereby the private key system is the Kerberos system.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing environment having a connection to a network, for enabling a server to perform tasks on behalf of a client in a public key environment using authorization obtained from a private key system (PRKS) without the client directly accessing the PRKS. This technique comprises: obtaining the authorization for the client from the PRKS using public key authentication; delegating the obtained authorization to the server; performing, by the server, the requested task using the delegated authorization; and returning a result of the performing from the server to the client.

In a first aspect, the obtaining further comprises: authenticating, in the PRKS, an identification of the client; and comparing, in the PRKS, the identification of the client to a stored mapping between a plurality of client identifications and client access privileges. In this aspect, the delegating further comprises: sending a session credential from the PRKS to the server when the comparing successfully locates the identification of the client; sending, responsive to receiving a request from the client, the session credential and a request for the delegated authorization from the server to the PRKS; checking stored policies in the PRKS, responsive to receiving the session credential and the request for delegated authorization; and sending the requested delegated authorization from the PRKS to the server when the checking has a successful outcome.

In a second aspect, this technique further comprises authenticating the PRKS in the client, and the obtaining further comprises: authenticating an identification of the client in the PRKS; and comparing, in the PRKS, the identification of the client to a stored mapping between a plurality of client identifications and client access privileges. In this aspect, the delegating further comprises: sending a session credential and, if message encryption is to be used, a session key from the PRKS to the server when the comparing successfully locates the identification of the client; sending, responsive to a request from the client, the session credential and a request for the delegated authorization from the server to the PRKS; checking stored policies in the PRKS, responsive to receiving the session credential and the request for delegated authorization; and sending the requested delegated authorization from the PRKS to the server when the checking has a successful outcome.

In a third aspect, the obtaining is invoked in response to receiving a request from the client, and further comprises: determining, in the server, one more authorization privileges that are required to perform the requested task; and requesting the authorization privileges from the client. In this aspect, the delegating is invoked in response to receiving the request for authorization privileges, and further comprises: verifying, in the client, the requested authorization privileges; sending a client certificate and a signed request for the requested authorization privileges from the client to the server; forwarding the client certificate and the signed request from the server to the PRKS; comparing, in the PRKS, an identification of the client from the client certificate to a stored mapping between a plurality of client identifications and client access privileges; checking, in the PRKS, stored delegation privileges to determine whether the client authorizes the server to receive the requested authorization privileges; and sending the requested authorization privileges from the PRKS to the server when the checking step has a successful outcome.

In a fourth aspect, this technique further comprises authenticating the PRKS in the client, and: the obtaining is invoked in response to a request from the client, and further comprises: forwarding the request from the server to the PRKS; and determining, in the PRKS, one or more authorization privileges which are required for performing the request. In this aspect, the delegating further comprises sending a session key and the requested authorization privileges from the PRKS to the server.

In each of these aspects, the requested authorization privileges may be represented by one or more authorization tickets. The PRKS may be a system known as "the Kerberos system".

The present invention will now be described with reference to the following drawings, in which like reference numbers denote the same element throughout.

DESCRIPTION OF THE PREFERRED EMBODIMENT

Figure 1:
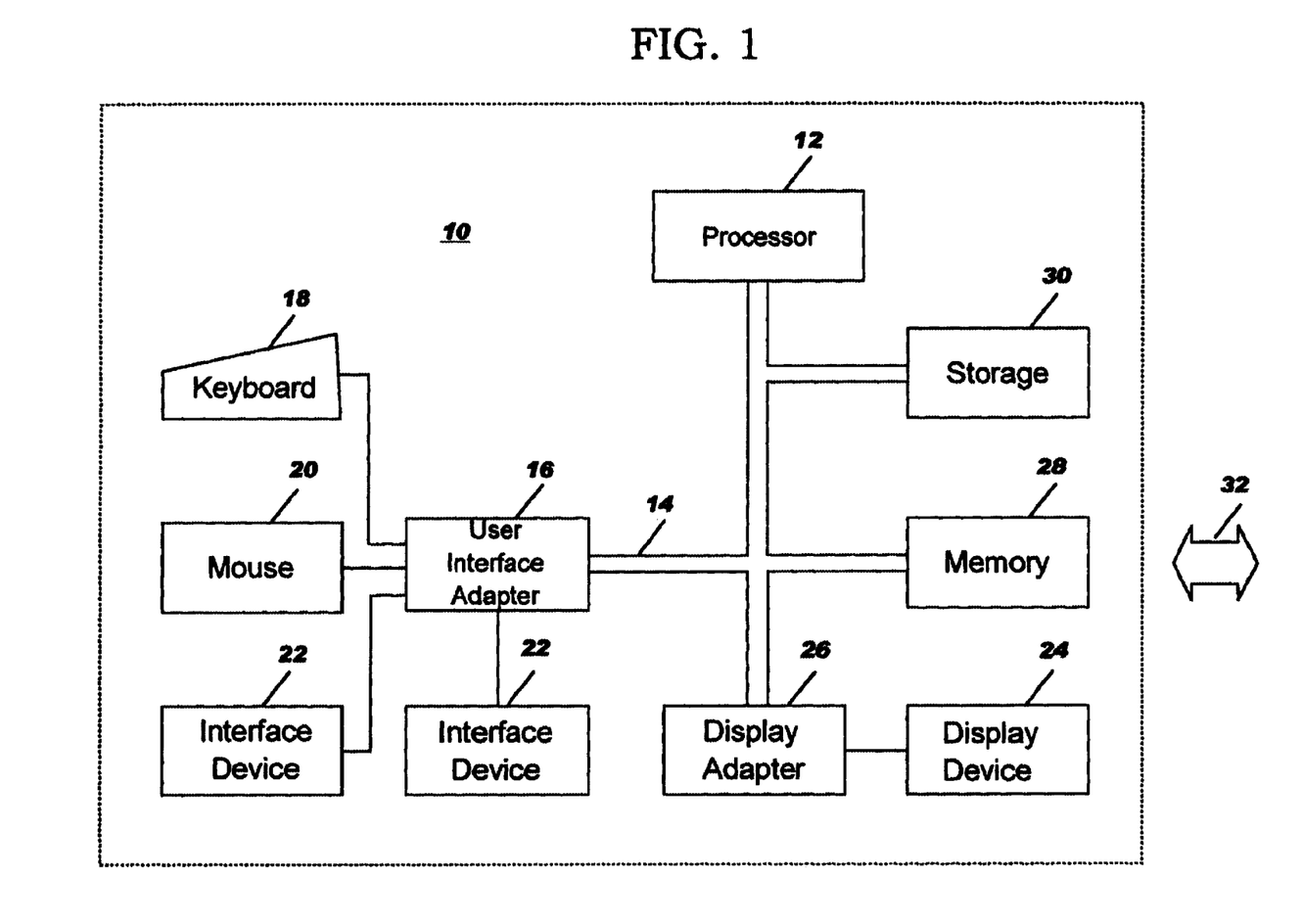
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
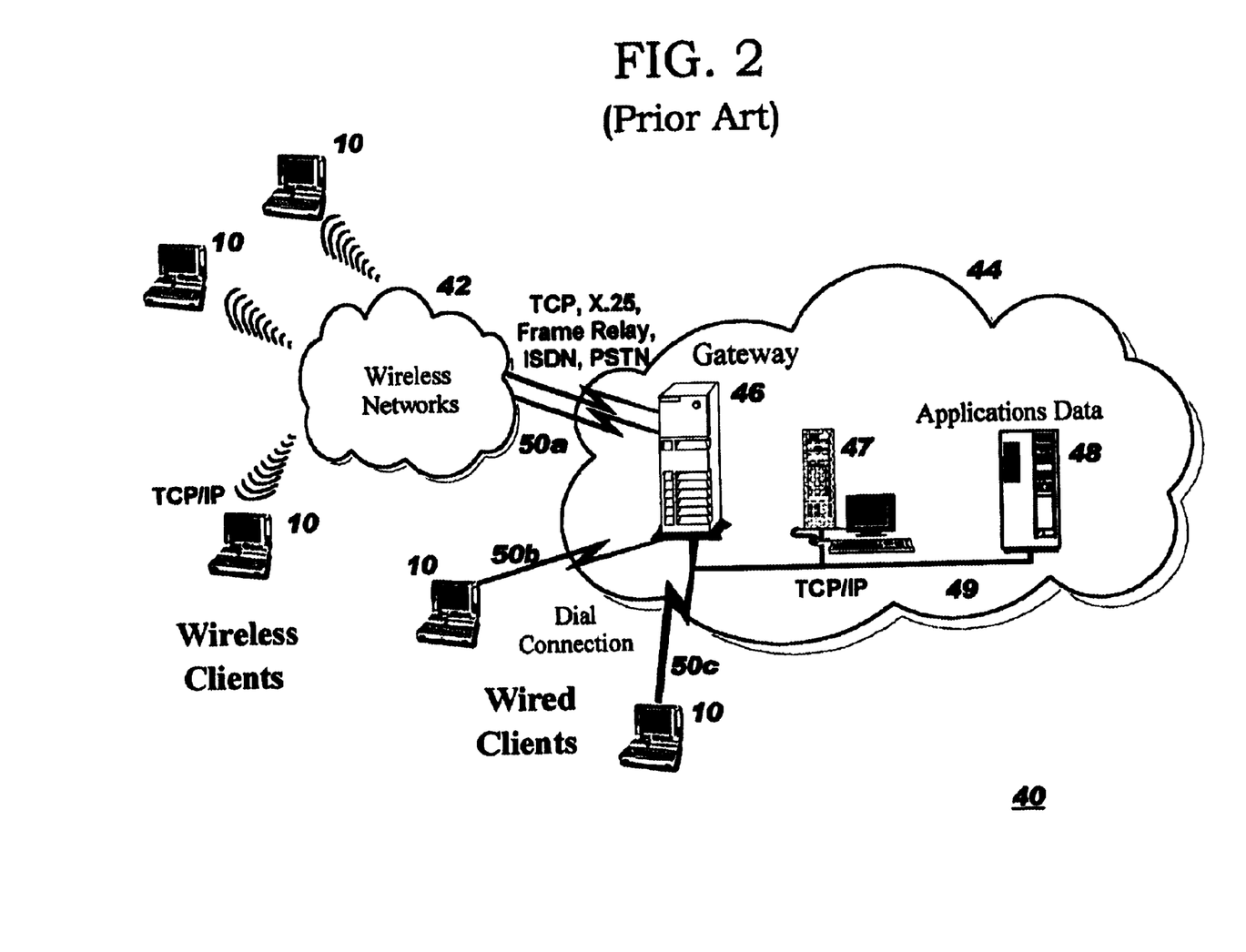
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstation 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention at a client computer may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the various alternative preferred embodiments, the present invention is implemented as one or more computer software programs. The software may be implemented as one or more modules (also referred to as code subroutines, or "objects" in object-oriented programming) which are invoked upon request. The location of the software (whether on the client workstation, server or private key system) will differ for the various alternative embodiments, as discussed below with reference to each embodiment. The logic implementing the delegation technique of the present invention may be integrated with the code of a program, or it may be implemented as one or more separate utility modules., which provide services that are invoked by such a program, without deviating from the inventive concepts disclosed herein. The server machine or process may be functioning as a Web server or process, where the Web server or process provides services in response to requests from a client connected through the Internet. Alternatively, the server machine or process may be in a corporate intranet or extranet of which the client's workstation is a component, or in any other network environment.

The preferred embodiment of the present invention will now be discussed in more detail with reference to FIGS. 3 through 8.

A delegation model enables users to securely delegate authority for accessing network resources to a specific server machine or process. That server machine or process can then access resources and perform tasks on the user's behalf, with authorization appropriate to that particular user. As described in detail earlier, the Kerberos private key system does provide a delegation model. Using Kerberos, a user can obtain a Kerberos ticket for access to a particular resource, where this ticket indicates a user's access rights or privileges for resources protected by the Kerberos system. The ticket can then be delivered to a server machine for use by the server machine on the user's behalf. Note that while the private key system is discussed herein as preferably being the Kerberos system, any other private key system which provides a trusted third-party authentication protocol may be used alternatively without deviating from the inventive concepts disclosed herein. In that case, references herein to "tickets" are to be considered as analogous to other equivalent representations of user credentials that may be provided in such alternative systems.

Currently, in the public key authentication process, random numbers referred to as "nonces" are generated at the user's machine (i.e. at the client) and at the server machine. These are exchanged. Each party (client and server machine) then digitally signs the nonce provided by the other party, using a private key associated with a public certificate. Each party then sends that public certificate and the signed nonce back to the other party. Each party then validates the digital signature on the nonce using the public key associated with the other party's certificate. This process is existing art and occurs, for example, in session set up for Secure Sockets Layer (SSL) sessions in which both parties are authenticated.

Public key authentication of both the server and the client may be performed. Several variations of this process are known in the art. For example, in the SSL protocol, the client creates a random nonce which is sent in the ClientHello message. The server also generates a random nonce which is sent in the ServerHello message. The server generates a signature for data consisting of the ClientHello.random (i.e. client nonce) followed by the ServerHello.random (i.e. server nonce) followed by the server key exchange parameters, and sends it along with the server certificate. The client uses the server public key from the certificate to validate the server's signature. When public key authentication of the client is performed, the client generates a signature for data consisting of all handshake messages prior to the signature itself followed by a master secret, which is itself generated from a client random number and from other information exchanged during the SSL handshake. The client sends the master secret to the server, encrypted with the server's public key, and also sends its certificate and the signature. The server can decrypt the master secret with its private key, and can validate the client's signature using the public key from the client certificate. (Refer to "The SSL Protocol, Version 3.0", dated Nov. 18, 1996 and available on the World Wide Web at http://home.netscape.com/eng/ssl3/draft302.txt, for more information on SSL.)

It is intended that the appended claims shall be construed to apply to all such variations on public key authentication, and specifically to those variations of public key authentication embodied in the SSL and TLS protocols. In the description of the present invention, reference is made to the exchange of a signed nonce, but it will be obvious to those skilled in the art that the digital signature may be created for data that includes not only the nonce but also, in addition to the nonce, other information exchanged between the client and server, as is the case in the SSL and TLS (Transport Layer Security) protocols. It is intended that the appended claims shall be construed to apply to all such variations. TLS is being defined by the IETF (Internet Engineering Task Force) as a follow-on replacement for SSL, and is documented in "The TLS Protocol, Version 1.0", dated Nov. 12, 1998.

The server machine or process now needs to access other network resources in a secure way using client-provided credentials, so that only resources the user is authorized to access are made available to the server machine or process. The server is trusted in the sense that it can also access the resources returned to the user, but that trust must be limited. (In other words, the server machine or process can only use the client-delegated credentials for a limited period or to perform a specific unit of work that the user has authorized the server machine or process to perform.) As stated earlier, this type of delegation is not currently available for public key systems. The present invention defines several alternative techniques by which this functionality can be provided, whereby authorization tickets are obtained from a private key system and then used to enable delegation within a public key environment.

Figure 3:
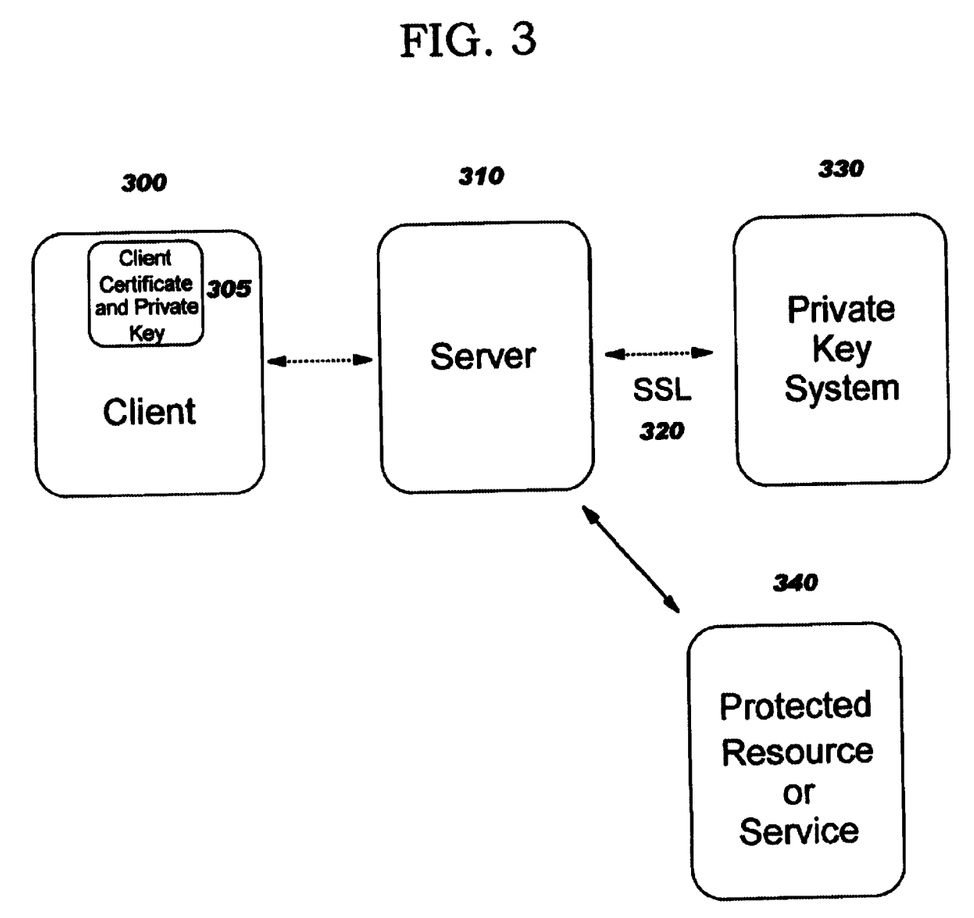
FIG. 3 illustrates the basic delegation model which allows a server to perform tasks on behalf of a client in a public key environment using authorization obtained from a private key system.

FIG. 3 illustrates the delegation model of the present invention, which delegates authority from a client 300 to a server machine or process 310. The server machine or process 310 may use this delegated authority to access data or services that are remotely located (i.e. on a different machine in the network) or to access data or services co-located with the server machine or process. Hereinafter, the term "server machine" will be used to refer to the server machine or process receiving the delegated authority. The delegation model depicted in FIG. 3 further comprises a secure communications path 320, a private key system 330 (such as Kerberos), and a protected resource or service 340. The client 300 maintains a client certificate and a private key 305, which it will use for authentication with the server 310 and private key system 330. The connection path 320 is used for sending encrypted messages between the server 310 and the private key system 330. This path may be established using a protocol such as SSL or TLS.

In this delegation model, the client 300 needs services or data from the protected resource or service 340. The client 300 will obtain credentials to enable the server 310 to access the services or data on its behalf. These credentials are obtained by accessing the private key system 330, and they are subsequently delegated to the server machine 310, in a variety of ways that are disclosed below in the preferred embodiments, which are discussed with reference to FIGS. 5–8.

With the delegation model disclosed herein, the client only has access to the private key system through the server machine. This offers a level of protection to the private key system from unauthorized access from the public network.

Four preferred embodiments of the present invention will now be described. Each embodiment provides an independent technique for delegating client authority to a server machine or process. The embodiments are intended to be used independently from one another.

FIRST PREFERRED EMBODIMENT

Figure 4:
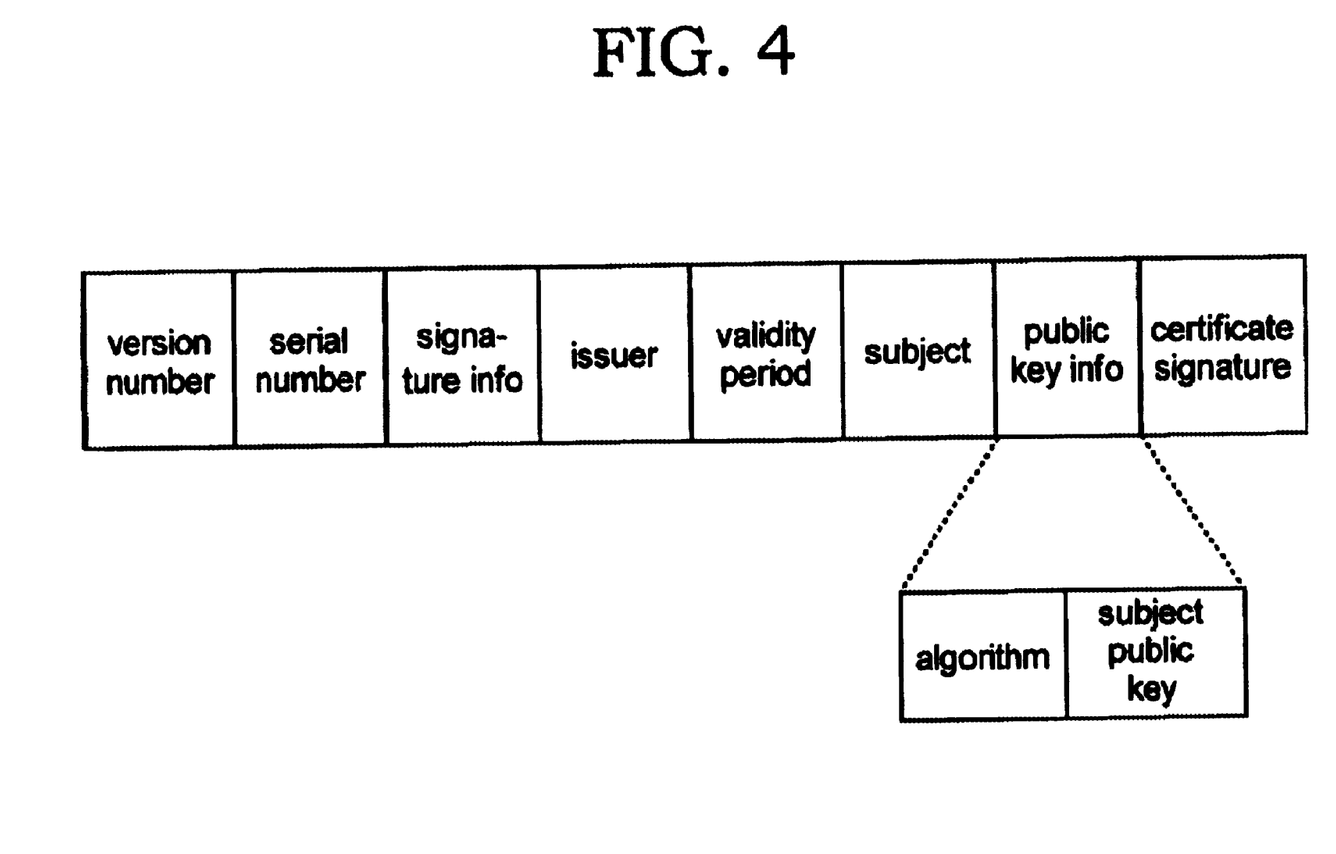
FIG. 4 depicts the format of an X.509 certificate that is used with the preferred embodiments of the present invention.
Figure 5:
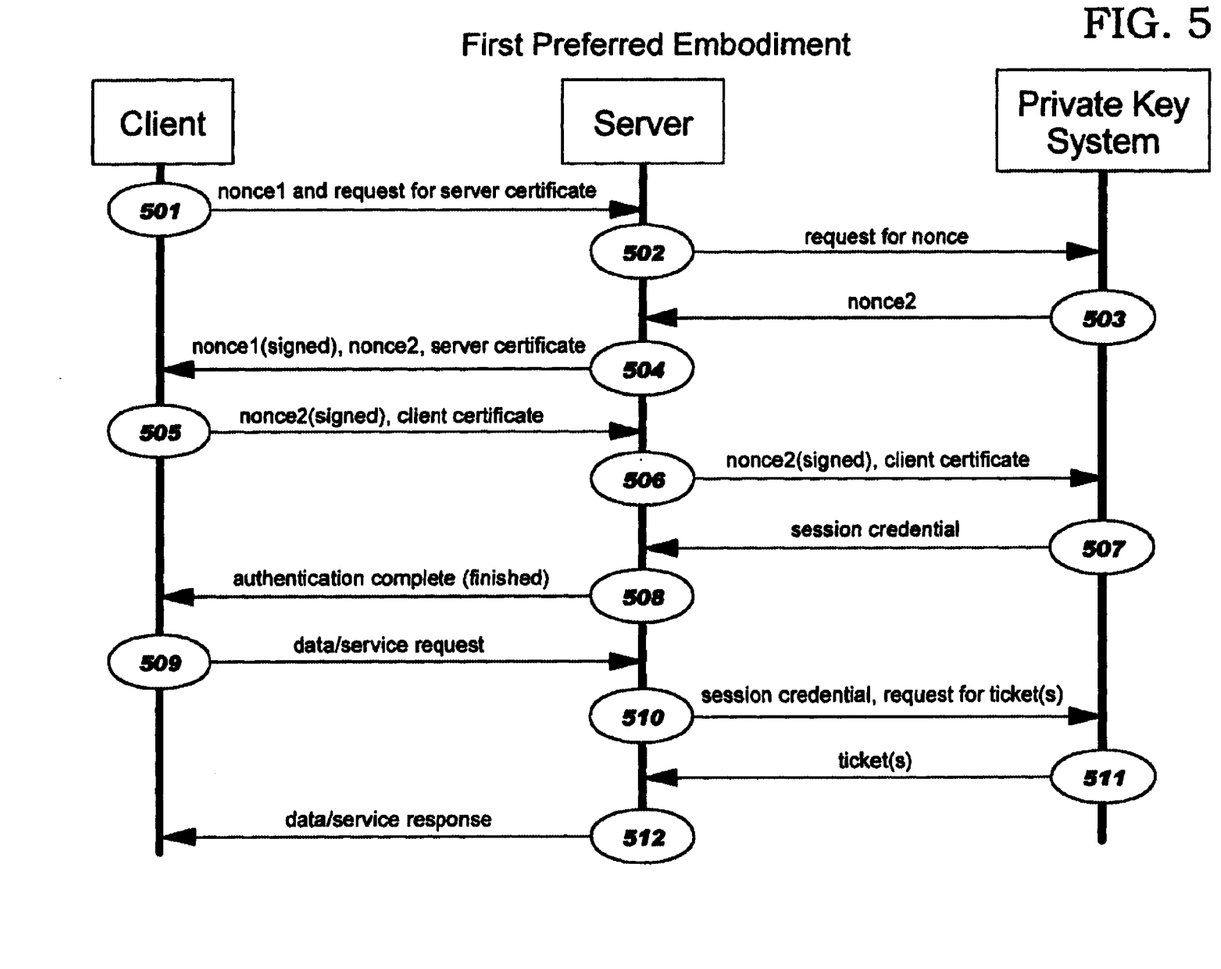
FIGS. 5–8 depict the message flows involved in the preferred embodiments of the present invention.

As discussed above with reference to FIG. 3, a client in a public key system wishes to delegate authority to a server machine or process to enable the server to access a protected resource on behalf of the client. FIG. 5 shows the message flows of a first preferred embodiment by which this delegation can be achieved. At 501, the client initiates the delegation process by sending a nonce (where a "nonce" is a randomly generated number) identified as nonce1 and a request for the server machine's certificate. Preferably, an X.509 certificate will be used. X.509 is an ITU Recommendation and International Standard that defines a framework for providing authentication. (See "ITU Recommendation X.509 (1997) Information Technology—Open Systems Interconnection—The Directory: Authentication Framework", hereinafter "Directory specification", dated Nov. 1993. This information is also published in International Standard ISO/IEC 9594-8 (1995).) A certificate format is defined in this standard. Certificates created according to this international standard, in the defined format, are referred to as "X.509 certificates". The format of an X.509 certificate is shown in FIG. 4. Hereinafter, references to "certificates" refer to the type of information shown in FIG. 4.

In this preferred embodiment, the server machine responds to this client message by sending a request 502 for another nonce to the private key system. The private key system responds 503 with a nonce (depicted in FIG. 5 as nonce2) to the server machine. The server machine then responds 504 to the initial client request 501 by sending the signed nonce1 (signed by the server), the private key system's nonce2 and the server machine's certificate to the client. The signed nonce1 and the server machine certificate allow the client to authenticate the server, and the nonce2 will be used to authenticate the client to the private key system (following flow 506). The client then responds 505 to the server machine with a signed nonce2 (signed by the client) and the client's certificate. This information is passed through the server machine to the private key system as shown at 506. The private key system authenticates the client using the signed nonce2 and client certificate.

In this embodiment, the private key system maintains a mapping between Kerberos identities, or principals, and client identification. The private key system uses the client's identifying information from the client certificate to retrieve information from this mapping which specifies the authority and access privileges of the current client. Successful mapping of the client request to the principal information stored at the private key system results in a session credential that is returned 507 to the server machine. This session credential is kept by the server for the duration of the client's secure connection to the server, but it is not passed to the client. The session credential is also kept by the private key system along with the identity of the client for which the credential was issued. At 508, the server completes the authentication process (e.g. by sending a "Finished" message when the SSL protocol is used). The client then issues a request 509 to the server, delegating authority for the server to access protected data or services. The server machine determines the ticket or tickets it will need to fulfill the client request 509. The server machine then sends 510 the session credential along with a request for the required tickets to the private key system. The private key system evaluates its policies to determine if the server machine should be granted the ticket(s) on behalf of that particular principal (that is, the private key system verifies whether this user will allow this server to perform the requested service on its behalf). If so, the ticket(s) are returned to the server machine at 511. The server machine then uses the ticket(s) for processing the client's request 509. Upon completion of the processing the delegated request for service, the resulting data is returned to the originating client at 512.

A potential exposure in this embodiment is that the client is delegating authority to the server machine to get tickets for units of work from the private key system without the client having specified the units of work that the client is authorizing the server to perform on its behalf, and therefore the server may request tickets for units of work that the user did not intend to authorize. To address this exposure, appropriate trust policies must be in place at the private key system to ensure the server is authorized to impersonate the client for the specific units of work to be performed.

SECOND PREFERRED EMBODIMENT

Figure 6:
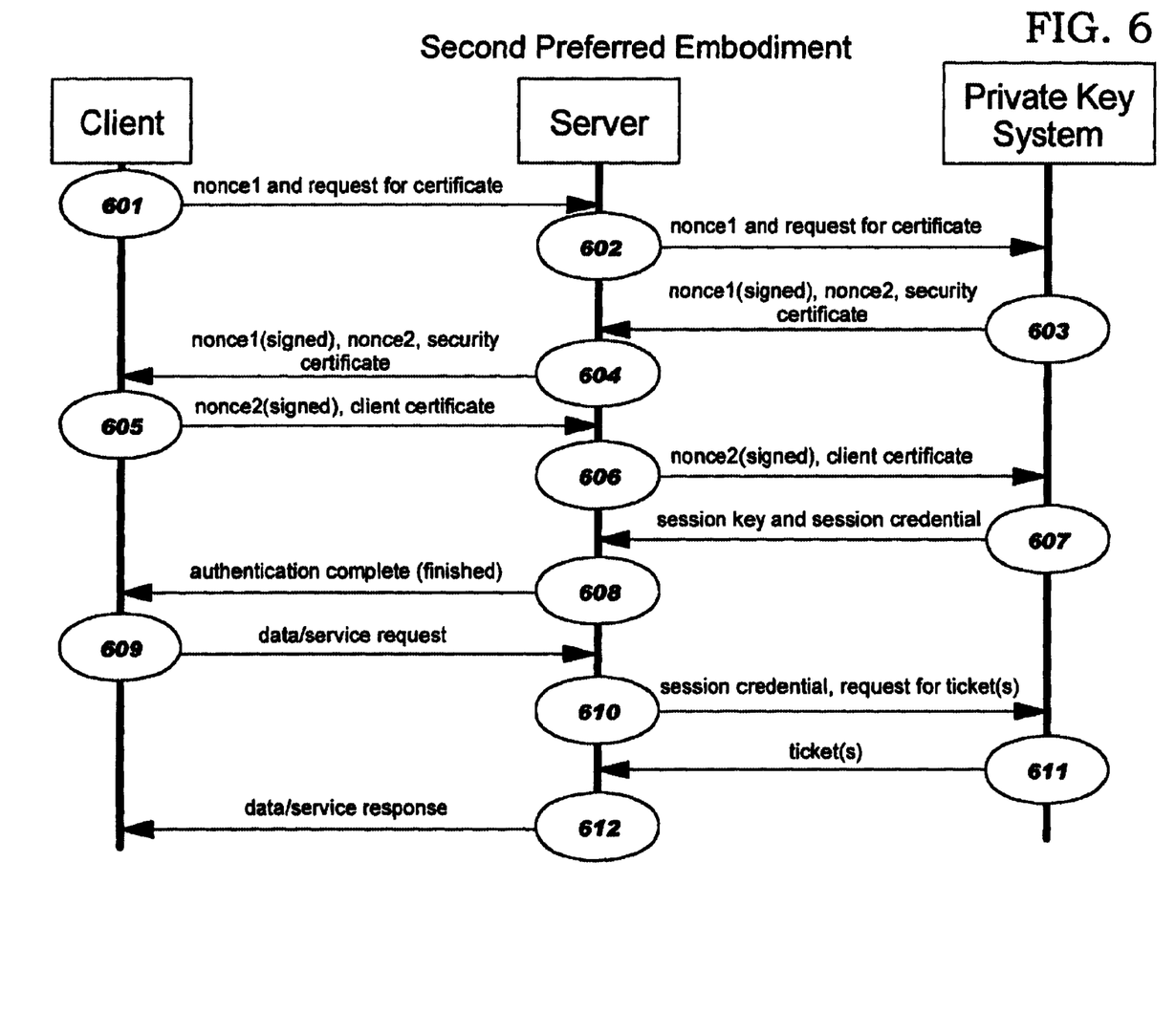

In the second preferred embodiment, the initial handshake process between the client, server, and private key system is modified from that described above for the first preferred embodiment. Referring to FIG. 6, the client sends an initial request at 601, comprising a nonce (nonce1) and a request for the server's certificate. The server forwards or tunnels all the client information received from the client during the handshaking process on to the private key system as shown at 602. (That is, the handshake process occurs between the client and the server machine, but the complete contents of that handshake are also forwarded to the private key system.) The private key system now has the nonce1 (from the client), and the original request from the client. The private key system responds 603 by sending a signed nonce1, a nonce2, and the private key system's certificate (identified in FIG. 6 as the security certificate) to the server. The server then forwards 604 this information to the client. The client then responds 605 by sending a signed nonce2 and the client certificate to the server. The server forwards 606 or tunnels this information to the private key system. The private key system then performs the mapping of client identifying information to stored access privileges, as described in the first preferred embodiment with reference to FIG. 5. Once this is completed, if data flows are to be encrypted, the session key(s) are sent 607 from the private key system to the server to enable the server to decrypt data requests coming in from the client and to encrypt the resulting messages to the client. (The session key or keys for encryption have already been derived on the client.) A session credential is also sent at 607 from the private key system to the server for use in obtaining tickets on behalf of the client. At 608, the server completes the authentication process. The client then sends a request 609 for data or service to the server. The server can decrypt the request with the session key provided by the private key system at 607. The server determines what ticket(s) it will need to complete the client request 609 and sends 610 the session credential and a request for the ticket(s) to the private key system. The private key system evaluates its policies to determine if the ticket(s) can be issued to the server to act on behalf of the client. If the server is authorized to act on behalf of the client, the ticket(s) are issued 611 to the server. The server then processes the request 609 on the client's behalf. The result of performing the delegated request is forwarded to the client when completed, as shown at 612.

THIRD PREFERRED EMBODIMENT

In the third preferred embodiment, the client and server perform a normal SSL handshake without involving the private key system. The private key system is not involved until the server machine needs to acquire ticket(s) on behalf of the client to process the client's request.

Figure 7:
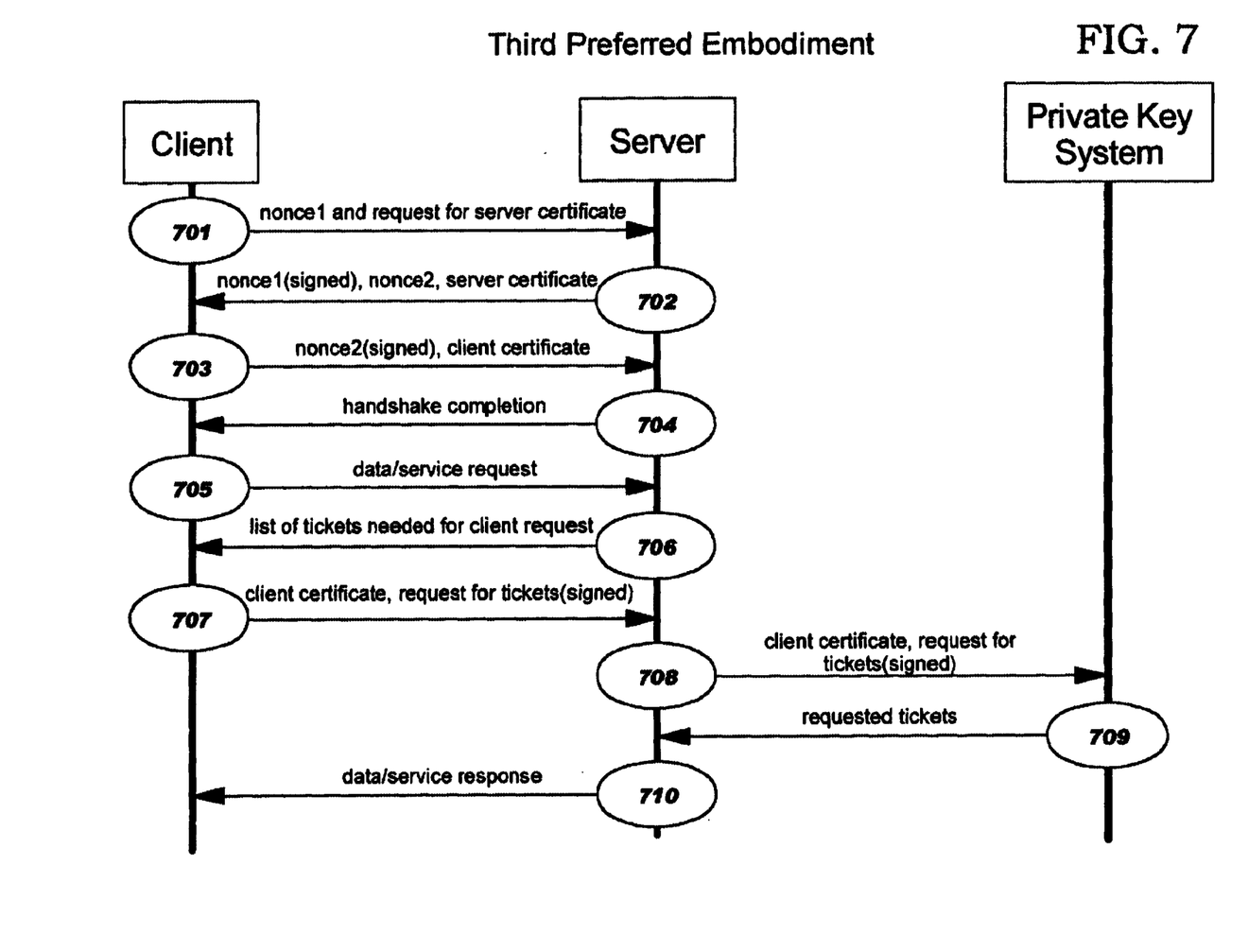

As shown in FIG. 7, the client sends a nonce (nonce1) and a request for the server certificate 701 to the server machine. The server machine responds 702 with its server certificate, a signed nonce1, and its own nonce (nonce2). The client uses the signed nonce1 and server's certificate to authenticate the server machine, and responds 703 to the server machine with a signed nonce2 and the client's certificate. The server machine uses the signed nonce2 and client certificate to authenticate the client. When the client is successfully authenticated by the server machine, the server machine completes the handshake as shown at 704. The client then sends the data or service request at 705 to the server machine for processing. The server machine determines the ticket(s) required to enable the server machine to process this request on behalf of the client, and sends 706 this list of needed ticket(s) to the client for approval. The client processing at this point may optionally involve the user, notifying the user that the server machine is attempting to impersonate the client for some units of work. If acceptable to the user, the client then sends 707 its client certificate with a signed request for the needed ticket(s) to the server machine. (If the user is not directly involved, then the delegation may be approved in some other manner, such as logic coded within the client application, using techniques which do not form part of the present invention.) The server machine forwards 708 the client certificate and signed request for needed ticket(s) to the private key system. The private key system maps the request as described in detail in the first preferred embodiment, then checks its policies to determine if the server machine is authorized to perform the requested processing on behalf of the client. If the result of this checking is satisfactory, the private key system will send 709 the requested ticket(s) to the server machine. The server machine performs the tasks on behalf of the client and sends 710 the data or result to the client.

This embodiment has the advantage of informing the client of the tickets it is authorizing for delegation to the server machine. This requires new programming code to be added to the client to understand and respond to the message from the server machine at 706 which contains the list of ticket(s) needed by the server machine to complete the delegated unit(s) of work.

FOURTH PREFERRED EMBODIMENT

In the fourth embodiment, the private key system contains the logic to determine what tickets the server machine will need to complete the unit(s) of work required to fulfill the client's request for data or services by the server machine. This preferred embodiment is similar to the second preferred embodiment in that the SSL handshake is tunneled through the server machine, but the actual exchange of certificates and credentials is between the client and the private key system. Because the client receives the private key system's certificate (as in the second preferred embodiment), it can validate that it is dealing with a known and trusted entity, and one that has authority for all the units of work required to complete the request.

Figure 8:
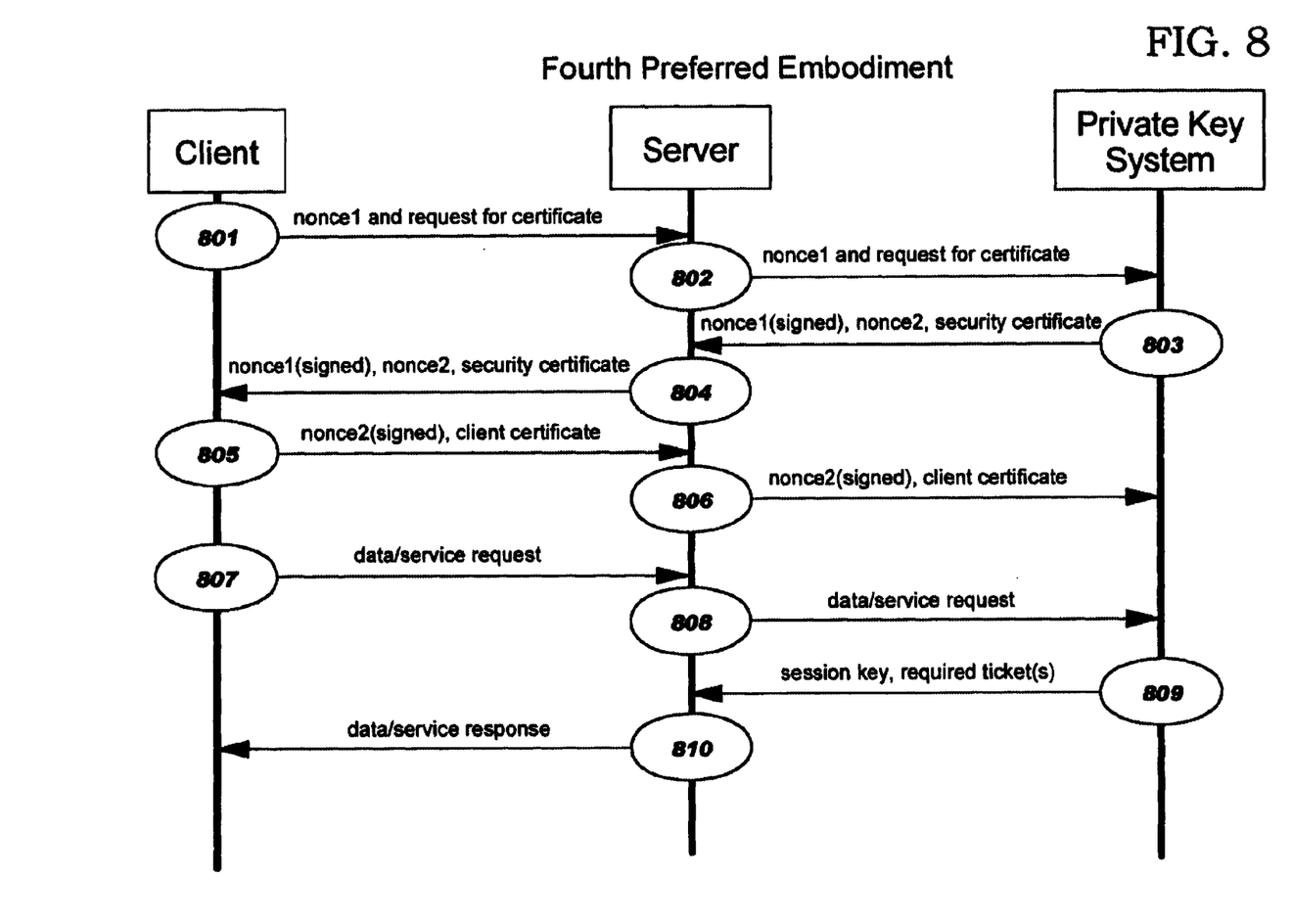

As shown in FIG. 8, the flows used for this fourth preferred embodiment begin at 801, where the client sends a nonce (nonce1) and a request for the server's certificate to the server machine. The server machine forwards 802 that request (i.e. tunnels it) to the private key system. The private key system signs nonce1 and responds 803 with the signed nonce1, a nonce (nonce2), and the private key system's certificate (identified as the security certificate) to the server machine. The server machine forwards 804 this information to the client. The client uses the signed nonce1 and security certificate to authenticate the private key system. The client then signs nonce2 and sends it back 805 to the server machine along with the client's certificate. The server machine forwards this response to the private key system at 806. The private key system then uses the signed nonce2 and client certificate to authenticate the client. At this point, the client and private key system have both authenticated each other with signed nonces and certificates. The client then sends 807 a request for data or service to the server machine. The server machine forwards 808 the request to the private key system. The private key system determines what ticket or tickets the server machine will need to perform the unit(s) of work requested by the client. The private key system then responds 809 to the server machine with the session key (as needed for encryption and decryption) and required ticket(s). When the server machine has completed the unit(s) of work on behalf of the client, the result is sent 810 back to the client.

An advantage of the fourth preferred embodiment is that the client does not have to change from current implementations in any respect. Another advantage is that tickets are only granted by the private key system for the requests the client specifically authored.

A disadvantage of the fourth embodiment is that the private key system must be able to evaluate the specific request to determine which tickets are needed to complete the units of work requested. This logic is currently not part of the private key system's functionality in typical private key system deployments. One manner in which this function may be added is to use a table of URLs (Uniform Resource Locators) with wildcards, similar to the manner in which Web server resource protection directives are defined. Such mechanisms are known in the art. Refer, for example, to the location directive in the Apache Directives document for Apache Web server 1.3, on the Web at http://www.apache.org/docs/mod/core.html# location.

Note that the private key system tickets obtained by the preferred embodiments are good only for a short period of time. After some period of time, it is necessary for the client and server machine to renew their public key authentication handshake so as to obtain fresh tickets from the private key system, via the same procedure as was used for the initial ticket or tickets.

Note further that there may be many servers all communicating with a single Kerberos or private key system to obtain tickets. Or, a single server may communicate with several Kerberos or private key systems (each authoritative for a particular domain or cell) to obtain tickets for its clients. Trust relationships may be established between various domains or cells so that tickets from the Kerberos or private key system in one domain or cell are valid to access resources in other domains.

While several preferred embodiments of the present invention have been described, additional variations and modifications may occur to those skilled in the art once they learn of the basic inventive concepts. The techniques disclosed herein are based upon certain predefined characteristics of a private key system and a public key system. It will be obvious to one of ordinary skill in the art that the inventive concepts disclosed herein may be adapted to changes in the public and private key systems, should they occur, including complete replacement with a new security system having the same purpose and function as those discussed herein. Therefore, it is intended that the appended claims shall be construed to include both the preferred embodiment and all such variations and modifications as fall within the spirit and scope of the invention.

What is claimed is:

1. In a computing environment having a connection to a network, computer readable code readable by a computer system in said environment, for enabling a server to perform tasks on behalf of a client in a public key environment using authorization obtained from a private key system (PRKS), comprising:

subprocess for obtaining said authorization by said server for said client from said PRKS using public key authentication, without said client directly accessing said PRKS;
a subprocess for delegating said obtained authorization to said server;
a subprocess in said server for performing said requested task using said delegated authorization; and
a subprocess in said server for returning a result of said performing to said client.

2. Computer readable code for enabling a server to perform tasks on behalf of a client in a public key environment according to claim 1, further comprising a subprocess in said client for authenticating said server, and wherein:
said subprocess for obtaining further comprises:
a subprocess in said PRKS for authenticating an identification of said client; and
a subprocess in said PRKS for comparing said identification of said client to a stored mapping between a plurality of client identifications and client access privileges; and
said subprocess for delegating further comprises:
a subprocess for sending a session credential from said PRKS to said server when said subprocess for comparing successfully locates said identification of said client;
a subprocess in said server, responsive to receiving a request from said client, for sending said session credential and a request for said delegated authorization to said PRKS;
a subprocess in said PRKS, responsive to receiving said session credential and said request for delegated authorization, for checking stored policies; and
a subprocess in said PRKS for sending said requested delegated authorization to said server when said subprocess for checking has a successful outcome.

3. Computer readable code for enabling a server to perform tasks on behalf of a client in a public key environment according to claim 2, wherein said delegated authorization is represented by one or more authorization tickets.

4. Computer readable code for enabling a server to perform tasks on behalf of a client in a public key environment according to claim 1, further comprising a subprocess in said client for authenticating said PRKS, and wherein:
said subprocess for obtaining further comprises:
a subprocess in said PRKS for authenticating an identification of said client; and
a subprocess in said PRKS for comparing said identification of said client to a stored mapping between a plurality of client identifications and client access privileges; and
said subprocess for delegating further comprises:
a subprocess for sending a session credential and, if message encryption is to be used, a session key from said PRKS to said server when said subprocess for comparing successfully locates said identification of said client;
a subprocess in said server, responsive to a request from said client, for sending said session credential and a request for said delegated authorization to said PRKS;
a subprocess in said PRKS, responsive to receiving said session credential and said request for delegated authorization, for checking stored policies; and
a subprocess in said PRKS for sending said requested delegated authorization to said server when said subprocess for checking has a successful outcome.

5. Computer readable code for enabling a server to perform tasks on behalf of a client in a public key environment according to claim 4, wherein said delegated authorization is represented by one or more authorization tickets.

6. Computer readable code for enabling a server to perform tasks on behalf of a client in a public key environment according to claim 1, further comprising:
a subprocess for authenticating said server at said client; and
a subprocess for authenticating said client at said server; and wherein:
said subprocess for obtaining is invoked in response to receiving a request from said client, and further comprises:
a subprocess in said server for determining one more authorization privileges that are required to perform said requested task; and
a subprocess for requesting said authorization privileges from said client; and
said subprocess for delegating is invoked in response to receiving said request for authorization privileges, and further comprises:
a subprocess in said client for verifying said requested authorization privileges;
a subprocess in said client for sending a client certificate and a signed request for said requested authorization privileges to said server;
a subprocess in said server for forwarding said client certificate and said signed request to said PRKS;
a subprocess in said PRKS for comparing an identification of said client from said client certificate to a stored mapping between a plurality of client identifications and client access privileges;
a subprocess in said PRKS for checking stored delegation privileges to determine whether said client authorizes said server to receive said requested authorization privileges; and
a subprocess for sending said requested authorization privileges from said PRKS to said server when said subprocess for checking has a successful outcome.

7. Computer readable code for enabling a server to perform tasks on behalf of a client in a public key environment according to claim 6, wherein said requested authorization privileges are represented by one or more authorization tickets.

8. Computer readable code for enabling a server to perform tasks on behalf of a client in a public key environment according to claim 1, further comprising a subprocess in said client for authenticating said PRKS and a subprocess in said PRKS for authenticating said client, and wherein:
said subprocess for obtaining is invoked in response to a request from said client, and further comprises:
a subprocess in said server for forwarding said request to said PRKS; and
a subprocess in said PRKS for determining one or more authorization privileges which are required for performing said request; and
said subprocess for delegating further comprises a subprocess for sending a session key and said determined authorization privileges from said PRKS to said server.

9. Computer readable code for enabling a server to perform tasks on behalf of a client in a public key environment according to claim 8, wherein said requested authorization privileges are represented by one or more authorization tickets.

10. Computer readable code for enabling a server to perform tasks on behalf of a client in a public key environment according to claim 1, wherein said PRKS is a system known as "the Kerberos system".

11. A system for enabling a server to perform tasks on behalf of a client in a public key environment using authorization obtained from a private key system (PRKS) in a computing environment having a connection to a network, comprising:
- means for obtaining said authorization by said server for said client from said PRKS using public key authentication, without said client directly accessing said PRKS;
- means for delegating said obtained authorization to said server;
- means in said server for performing said requested task using said delegated authorization; and
- means in said server for returning a result of said performing to said client.

12. The system for enabling a server to perform tasks on behalf of a client in a public key environment according to claim 11, further comprising means in said client for authenticating said server, and wherein:
- said means for obtaining further comprises:
  - means in said PRKS for authenticating an identification of said client; and
  - means in said PRKS for comparing said identification of said client to a stored mapping between a plurality of client identifications and client access privileges; and
- said means for delegating further comprises:
  - means for sending a session credential from said PRKS to said server when said means for comparing successfully locates said identification of said client;
  - means in said server, responsive to receiving a request from said client, for sending said session credential and a request for said delegated authorization to said PRKS;
  - means in said PRKS, responsive to receiving said session credential and said request for delegated authorization, for checking stored policies; and
  - means in said PRKS for sending said requested delegated authorization to said server when said means for checking has a successful outcome.

13. The system for enabling a server to perform tasks on behalf of a client in a public key environment according to claim 12, wherein said delegated authorization is represented by one or more authorization tickets.

14. The system for enabling a server to perform tasks on behalf of a client in a public key environment according to claim 11, further comprising means in said client for authenticating said PRKS, and wherein:
- said means for obtaining further comprises:
  - means in said PRKS for authenticating an identification of said client; and
  - means in said PRKS for comparing said identification of said client to a stored mapping between a plurality of client identifications and client access privileges; and
- said means for delegating further comprises:
  - means for sending a session credential and, if message encryption is to be used, a session key from said PRKS to said server when said means for comparing successfully locates said identification of said client;
  - means in said server, responsive to a request from said client, for sending said session credential and a request for said delegated authorization to said PRKS;
  - means in said PRKS, responsive to receiving said session credential and said request for delegated authorization, for checking stored policies; and
  - means in said PRKS for sending said requested delegated authorization to said server when said means for checking has a successful outcome.

15. The system for enabling a server to perform tasks on behalf of a client in a public key environment according to claim 14, wherein said delegated authorization is represented by one or more authorization tickets.

16. The system for enabling a server to perform tasks on behalf of a client in a public key environment according to claim 11, further comprising:
- means for authenticating said server at said client;
- means for authenticating said client at said server; and wherein:
- said means for obtaining is invoked in response to receiving a request from said client, and further comprises:
  - means in said server for determining one more authorization privileges that are required to perform said requested task; and
  - means for requesting said authorization privileges from said client; and
- said means for delegating is invoked in response to receiving said request for authorization privileges, and further comprises:
  - means in said client for verifying said requested authorization privileges;
  - means in said client for sending a client certificate and a signed request for said requested authorization privileges to said server;
  - means in said server for forwarding said client certificate and said signed request to said PRKS;
  - means in said PRKS for comparing an identification of said client from said client certificate to a stored mapping between a plurality of client identifications and client access privileges;
  - means in said PRKS for checking stored delegation privileges to determine whether said client authorizes said server to receive said requested authorization privileges; and
  - means for sending said requested authorization privileges from said PRKS to said server when said means for checking has a successful outcome.

17. The system for enabling a server to perform tasks on behalf of a client in a public key environment according to claim 16, wherein said requested authorization privileges are represented by one or more authorization tickets.

18. The system for enabling a server to perform tasks on behalf of a client in a public key environment according to claim 11, further comprising means in said client for authenticating said PRKS and means in said PRKS for authenticating said client, and wherein:
- said means for obtaining is invoked in response to a request from said client, and further comprises:
  - means in said server for forwarding said request to said PRKS; and
  - means in said PRKS for determining one or more authorization privileges which are required for performing said request; and
- said means for delegating further comprises means for sending a session key and said determined authorization privileges from said PRKS to said server.

19. The system for enabling a server to perform tasks on behalf of a client in a public key environment according to claim 18, wherein said requested authorization privileges are represented by one or more authorization tickets.

20. The system for enabling a server to perform tasks on behalf of a client in a public key environment according to claim 11, wherein said PRKS is a system known as "the Kerberos system".

21. A method for enabling a server to perform tasks on behalf of a client in a public key environment using authorization obtained from a private key system (PRKS) in a computing environment having a connection to a network, comprising the steps of:

obtaining said authorization by said server for said client from said PRKS using public key authentication, without said client directly accessing said PRKS;

delegating said obtained authorization to said server;

performing, by said server, said requested task using said delegated authorization; and returning a result of said performing from said server to said client.

22. The method for enabling a server to perform tasks on behalf of a client in a public key environment according to claim 21, further comprising the step of authenticating, in said client, said server, and wherein:

said obtaining step further comprises the steps of:
authenticating, in said PRKS, an identification of said client; and
comparing, in said PRKS, said identification of said client to a stored mapping between a plurality of client identifications and client access privileges; and said delegating step further comprises the steps of:
sending a session credential from said PRKS to said server when said comparing step successfully locates said identification of said client;
sending, responsive to receiving a request from said client, said session credential and a request for said delegated authorization from said server to said PRKS;
checking stored policies in said PRKS, responsive to receiving said session credential and said request for delegated authorization; and
sending said requested delegated authorization from said PRKS to said server when said checking step has a successful outcome.

23. The method for enabling a server to perform tasks on behalf of a client in a public key environment according to claim 22, wherein said delegated authorization is represented by one or more authorization tickets.

24. The method for enabling a server to perform tasks on behalf of a client in a public key environment according to claim 21, further comprising the step of authenticating said PRKS in said client, and wherein:

said obtaining step further comprises the steps of:
authenticating an identification of said client in said PRKS; and
comparing, in said PRKS, said identification of said client to a stored mapping between a plurality of client identifications and client access privileges; and said delegating step further comprises the steps of:
sending a session credential and, if message encryption is to be used, a session key from said PRKS to said server when said comparing step successfully locates said identification of said client;
sending, responsive to a request from said client, said session credential and a request for said delegated authorization from said server to said PRKS;
checking stored policies in said PRKS, responsive to receiving said session credential and said request for delegated authorization; and
sending said requested delegated authorization from said PRKS to said server when said checking step has a successful outcome.

25. The method for enabling a server to perform tasks on behalf of a client in a public key environment according to claim 24, wherein said delegated authorization is represented by one or more authorization tickets.

26. The method for enabling a server to perform tasks on behalf of a client in a public key environment according to claim 21, further comprising the steps of:

authenticating said server at said client; and authenticating said client at said server; and wherein:
said obtaining step is invoked in response to receiving a request from said client, and further comprises the steps of:
determining, in said server, one more authorization privileges that are required to perform said requested task; and
requesting said authorization privileges from said client; and said delegating step is invoked in response to receiving said request for authorization privileges, and further comprises the steps of:
verifying, in said client, said requested authorization privileges;
sending a client certificate and a signed request for said requested authorization privileges from said client to said server;
forwarding said client certificate and said signed request from said server to said PRKS;
comparing, in said PRKS, an identification of said client from said client certificate to a stored mapping between a plurality of client identifications and client access privileges;
checking, in said PRKS, stored delegation privileges to determine whether said client authorizes said server to receive said requested authorization privileges; and
sending said requested authorization privileges from said PRKS to said server when said checking step has a successful outcome.

27. The method for enabling a server to perform tasks on behalf of a client in a public key environment according to claim 26, wherein said requested authorization privileges are represented by one or more authorization tickets.

28. The method for enabling a server to perform tasks on behalf of a client in a public key environment according to claim 21, further comprising the step of authenticating said PRKS in said client and the step of authenticating said client in said PRKS, and wherein:

said obtaining step is invoked in response to a request from said client, and further comprises the steps of:
forwarding said request from said server to said PRKS; and
determining, in said PRKS, one or more authorization privileges which are required for performing said request; and said delegating step further comprises the step of sending a session key and said determined authorization privileges from said PRKS to said server.

29. The method for enabling a server to perform tasks on behalf of a client in a public key environment according to claim 28, wherein said requested authorization privileges are represented by one or more authorization tickets.

30. The method for enabling a server to perform tasks on behalf of a client in a public key environment according to claim 21, wherein said PRKS is a system known as "the Kerberos system".

* * * * *